C. FASSETT.
BOLT.
APPLICATION FILED MAR. 21, 1922.
1,429,859. Patented Sept. 19, 1922.
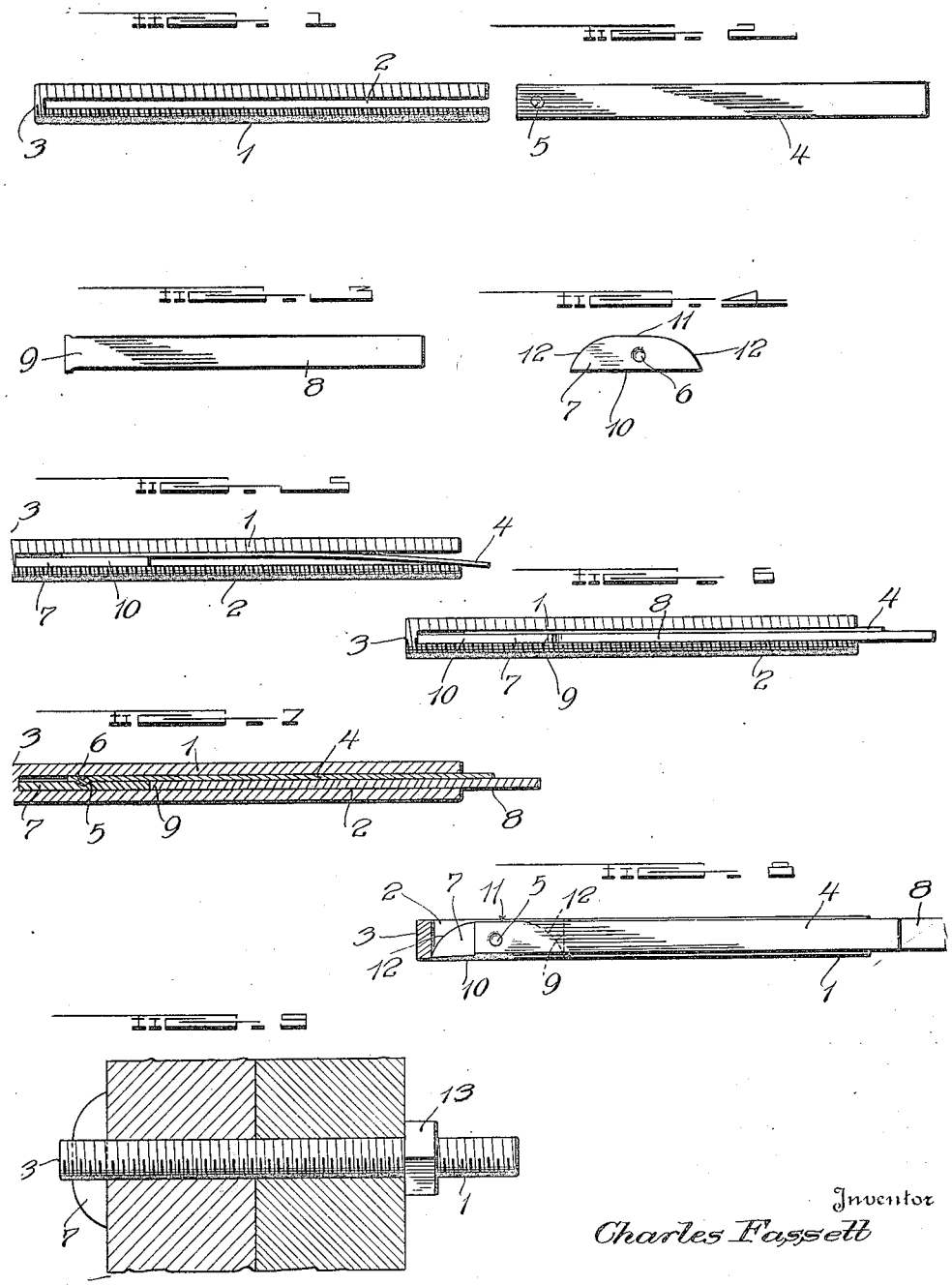
Inventor
Charles Fassett
By Townsend & Townsend
Attorneys Patented Sept. 19, 1922.

1,429,859

UNITED STATES PATENT OFFICE.

CHARLES FASSETT, OF ST. JOHNSBURY, VERMONT.

BOLT.

Application filed March 21, 1922. Serial No. 545,459.

*To all whom it may concern:*

Be it known that I, CHARLES FASSETT, a citizen of the United States, residing at St. Johnsbury, in the county of Caledonia and State of Vermont, have invented certain new and useful Improvements in a Bolt, of which the following is a specification.

My invention relates to bolts and such like fasten-elements and has particular reference to a bolt adapted to be employed on work where space is so limited as to preclude the use of the conventional form of bolt.

The primary object of the invention is to provide in a device of this character, a bolt stem equipped with means by which a bolt head member may be positioned after the bolt is inserted in the work.

Another object is the provision of such a bolt having a head member removable from the stem through the nut end thereof.

A further object is the provision in a bolt of this character of means insertable through the nut end for manipulating the bolt head.

With these, and such other objects in view, as will be apparent from the description, the invention resides in the novel construction, combination, and arrangement of parts hereinafter described and claimed and illustrated in the accompanying drawings, of which:

Figure 1 is an elevation of a bolt stem constructed in accordance with the invention, Figure 2, an elevation of a friction plate employed, Figure 3, an elevation of the head operating key, Figure 4, an elevation of the bolt head member, Figure 5, an elevation of a stem equipped with a friction plate and head before extension, Figure 6, an elevation similar to Figure 5, with the operating key partially inserted, Figure 7, a longitudinal section through Figure 6, Figure 8, a longitudinal section through Figure 6 at right angles to that of Figure 7, and Figure 9, a sectional illustration of the bolt as applied.

In the preferred form as illustrated, my invention comprises a threaded bolt stem 1 provided with a central longitudinal slot 2 extending from one end, which is the nut carrying end, and terminating at a relatively short distance from the opposite or head end 3.

A friction plate 4 somewhat bowed under spring tension as shown in Figure 5, and of a width corresponding to the width of the stem inside of the thread and thickness less than the slot 2, is adapted to be positioned longitudinally of the stem within the slot. This plate 4 is provided at its inner end with a pressed stud 5 received in a socket 6 formed in a head member 7, whereby when in assembled position, pivotal connection is established between the plate and head member.

Cooperating with friction plate 4 and head 7 is an operating key 8 provided with a slightly flared inner end 9 for engagement with the head member when applied. Key 8 and head 7 are of sufficient thickness to fill, when applied with the friction plate 4, the slot 2 so that owing to the tension of the friction plate the parts will be securely held against lateral displacement. Head 7 is formed with a straight edge 10 at one side extending its entire length, a relatively short straight edge 11 at the opposite side, and curved ends 12, and it corresponds in width to the diameter of the stem 1.

In operation, head 7 is applied over stud 5 of the friction plate and turned longitudinally thereof after which it is inserted in the slot. The bolt stem is then inserted in the work and on insertion of the key 8 through the nut end and requisite longitudinal movement, head 7 by reason of engagement of its curved end with portion 3 of the stem, will be forced out of the slot to extend transversely of the bolt taking the position illustrated in Figure 9, with the edge 11 engaging portion 3 of the stem and providing a head for the bolt. A nut 13 may then be applied in the usual manner to tighten the assembled bolt. In this preferred form the friction plate 4 and key 8 extend when in assembled position, to the nut end of the bolt, but if desired these parts may be made shorter or longer, so that they may be manipulated by suitable tools.

The invention is capable of other uses than that described, and while certain details have been referred to as illustrative of the device, I desire it to be understood that I do not intend to limit the invention to these, but that any changes and modifications may be made as will fall within the scope of the invention as claimed.

I claim:—

1. A device of the character described comprising a longitudinally slotted bolt stem, a head member slidable in the slot, means for frictionally retaining said head in the slot, and means slidable through said slot for extending the head.

2. A device of the character described comprising a longitudinally slotted bolt stem, a head member slidable in the slot, a friction member to retain said head in the slot, and a key for operating said head, said head, friction member and key being slidably insertable and removable longitudinally of the stem through said slot.

3. A device of the character described comprising a longitudinally slotted bolt stem, a head member slidable in the slot, a friction member to retain said head in the slot, pivotal connection between said head and friction member, and means slidable longitudinally of the stem through the slot for extending said head transversely of the stem.

4. A device of the character described comprising a longitudinally slotted bolt stem, a head member, a friction plate to retain said head in the slot when applied, said head being adapted for pivotal mounting on the friction member, and a key insertable through said slot longitudinally of the stem to force said head out of the slot and transversely of the stem.

5. A device of the character described comprising a stem, an independent head therefor, means for inserting and retaining said head in the stem in longitudinal relation therewith, and separate means for moving said head to extend transversely of the stem.

6. In a bolt, a stem slotted longitudinally from one end, a tensioned friction plate slidable longitudinally therethrough, a head pivoted to said plate for movement therewith, and a key insertable in said stem through the slot to engage and move said head transversely of the stem.

7. In a bolt, a stem slotted longitudinally from one end, a plate slidable longitudinally therein and spring tensioned to maintain position in the slot, a stud on one end of said plate, a head provided with a socket to receive said stud for pivotal connection of the head and plate, and a key longitudinally slidable through the slot to extend said head transversely of the stem, said plate, head and key being insertable through the slot from the open end.

In testimony whereof I affix my signature.

CHARLES FASSETT.